United States Patent [19]
Brunssen

[11] 4,295,188
[45] Oct. 13, 1981

[54] CONVERTER CIRCUIT PROVIDING ISOLATION AND LOAD SENSING

[75] Inventor: James E. Brunssen, Parsippany, N.J.

[73] Assignee: Bell Telephone Laboratories, Incorporated, Murray Hill, N.J.

[21] Appl. No.: 103,271

[22] Filed: Dec. 13, 1979

[51] Int. Cl.³ .......................................... H02M 3/335
[52] U.S. Cl. .................................................. 363/21
[58] Field of Search .......................... 331/112, 146; 363/18–21, 55, 56, 97

[56] References Cited

U.S. PATENT DOCUMENTS

| | | | |
|---|---|---|---|
| 3,427,525 | 2/1969 | Thornwall | 363/19 |
| 3,435,320 | 3/1969 | Lee et al. | 363/19 |
| 3,639,826 | 2/1972 | Grundberg | 363/19 |
| 3,889,173 | 6/1975 | Klusmann et al. | 331/112 X |
| 3,986,096 | 10/1976 | Kearsley | 363/18 |
| 4,058,758 | 11/1977 | Peterson | 363/21 |

FOREIGN PATENT DOCUMENTS 676761  12/1963  Canada .................................. 363/19

OTHER PUBLICATIONS

Ervin, Harold D., "Transistor Power Supply has Overload Protection", *Electronics*, p. 74, Jun. 20, 1958.

*Primary Examiner*—William M. Shoop
*Attorney, Agent, or Firm*—Robert O. Nimtz

[57] ABSTRACT

DC-to-DC converter circuitry which provides input-to-output isolation, sensing of load conditions and minimal standby losses comprises: a blocking oscillator including switch means (10) and energy storage means (50); and control circuitry (12,32,46,47) for sensing load demands and reducing the oscillator frequency under no-load conditions.

9 Claims, 6 Drawing Figures

CONVERTER CIRCUIT PROVIDING ISOLATION AND LOAD SENSING

BACKGROUND OF THE INVENTION

1. Field of the Invention

This invention relates generally to DC-to-DC converters and, more particularly, to converters of the blocking oscillator type wherein standby losses are minimized.

2. Description of the Prior Art

In telephone system applications, particularly those relating to transmission over multipair cables, deleterious interference by spurious signals causes noise and degrades the quality of transmission. Oftentimes the unwanted signals are electromagnetically coupled to the individual pairs comprising the cable and cause longitudinal or common-mode current to flow along the conductors of the pair to ground. If the cable pair itself or the pair terminations are not well-balanced or matched with respect to ground, the longitudinal current is converted to a metallic or balance-mode signal which results in degrading noise. Noise arising from such unbalances may be reduced by improving the balance, reducing the longitudinal current flowing through the unbalanced components or by a combination of both techniques.

Conventional noise mitigation techniques generally employ magnetic apparatus such as a repeat coil or a multipair neutralizing transformer. The repeat coil provides improved performance by increasing the balance at a termination point, but at the expense of manufacturing complexity in constructing precision components. The neutralizing transformer mitigates noise by providing a counteracting longitudinal voltage. However, the transformer technique has the disadvantage that all pairs to be treated by a single transformer must be in the same cable. Another disadvantage is that a single subscriber-induced longitudinal signal is coupled to the longitudinal circuit of all other pairs being protected.

An electronic alternative to the magnetic technique is the subject matter of this invention. Conventionally, at least one end of a subscriber loop or trunk pair is terminated in a low impedance, battery feed circuit having center taps connected to battery and ground. The pesent invention relates to a DC-to-DC converter, which has its output isolated from both the battery and ground and which is substituted for the conventional battery-ground circuit. Longitudinal current is reduced because the low impedance longitudinal ground connection is eliminated, thus providing a concomitant reduction in metallic noise arising from longitudinal-to-metallic conversion.

Also as part of the overall battery-ground substitution strategy of the present invention, since the converter is utilized in a system wherein powering requests are intermittent, it is necessary to minimize losses in the standby mode. Prior art converters do not provide the combined requirements of input-to-output isolation and minimal standby power loss.

U.S. Pat. No. 3,427,525, issued to J. C. Thornwall, is representative of prior art converters which are designed primarily to regulate the continuous output signal of the converter. Regulation in the circuit of Thornwall is accomplished by clamping and then releasing a blocking oscillator depending on the load power demands. The clamp release times are determined by a comparison of the output load voltage to a fixed reference voltage. This comparison is accomplished by a direct feedback connection between the load and comparator circuit. Such a connection destroys the isolation between input and output which is essential to increased common-mode impedance.

SUMMARY OF THE INVENTION

These and other shortcomings, limitations and deficiencies of prior art converters are obviated in accordance with the illustrative embodiment of the present invention by an improved DC-to-DC converter which provides input-to-output isolation, load sensing and minimal standby losses. In the preferred embodiment, the converter is characterized by: a conventional blocking oscillator comprising a transistor and a transformer wherein the transformer has primary, secondary (load), tertiary (regulation) and drive windings; and control circuitry coupling the tertiary circuit to the oscillator transistor. The control circuitry senses the level of current flow in the secondary winding and substantially reduces the oscillator frequency under no-load conditions so as to decrease standby losses. Moreover, the control circuitry senses increased load current demand and provides for fast recovery to fully regulated output voltage and current.

The features, objects and advantages of the present invention will be apparent hereinafter from a detailed description of the invention and the appended claims taken in conjunction with the attached drawing of an illustrative embodiment.

DETAILED DESCRIPTION

Figure 1:
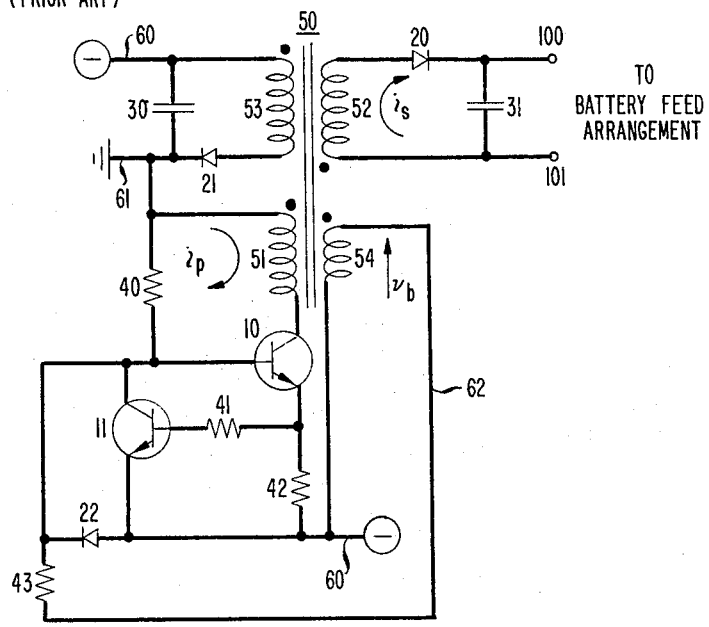
FIG. 1 is illustrative of a prior art conventional blocking oscillator converter forming the basis of the improved DC-to-DC converter in accordance with the pesent invention.
Figure 6:
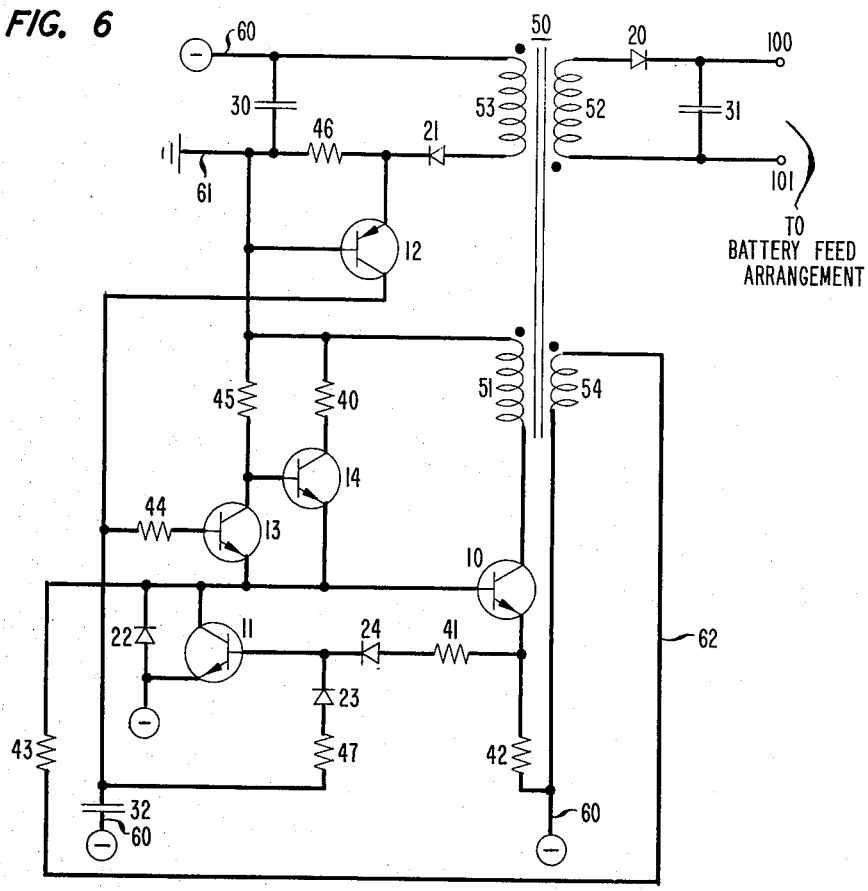
FIG. 6 is an illustrative embodiment of the improved DC-to-DC converter circuit in accordance with the present invention.

To clearly elucidate the improvement in accordance with the present invention, an operational description of the conventional blocking oscillator converter of FIG. 1 is first presented. The structure and operation of the improved converter of FIG. 6 is thereafter presented.

Figure 2:
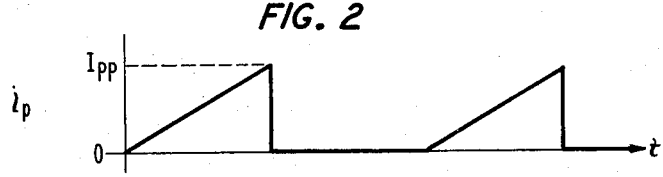
FIGS. 2, 3 and 4 depict internal waveshapes, respectively, of the current in primary winding 51, current in secondary winding 52 and the voltage across drive winding 54 of the circuit illustrated in FIG. 1.
Figure 3:
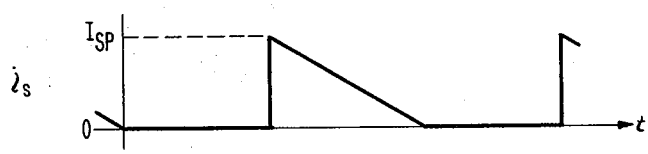
Figure 4:
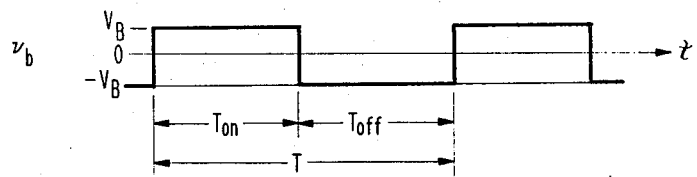

The basic prior art converter circuit is shown in FIG. 1 and certain internal, idealized switching waveforms are shown in FIGS. 2 through 4. The basic circuit comprises switching transistor 10 and multiwinding pulse transformer 50 having primary winding 51, secondary or load winding 52, tertiary or regulation winding 53 and drive winding 54. During the charging interval, designated $T_{on}$ in FIG. 4, transistor 10 is "ON." Primary winding 51 is connected between the collector of transistor 10 and ground on lead 61. Resistor 42, connected from the emitter of transistor 10 to the input battery voltage, $-V$ on lead 60, is sufficiently small so that initially almost the entire input battery voltage appears across primary 51. The primary current, designated $i_p$ in FIG. 2, increases linearly as a ramp. The drive current to the base of transistor 10 is provided by the voltage on lead 62 via resistor 43 in series with drive winding 54, which also supplies a switching bias voltage, designated $v_b$ and shown pictorially in FIG. 4. During the charging interval, diodes 20 and 21, in series with secondary 52 and tertiary 53, repectively, are reversed biased, as illustrated by the transformer dot convention shown in FIG. 1, and no current flows in secondary winding 52 or tertiary winding 53.

Primary current $i_p$ continues to increase linearly until the maximum value, shown as $I_{pp}$ in FIG. 2, is reached. At this point, the voltage being developed across resistor 42 is sufficient to turn transistor 11 "ON" via its base drive resistor 41 connected to the emitter of transistor 10. Since transistor 11 has its collector connected to the base of transistor 10 and its emitter connected to the input battery, base drive to transistor 10 is decreased. Reduced base drive increases the collector-to-emitter voltage of transistor 10 so that the voltage across primary 51 and hence across drive winding 54 is decreased. Due to this diminished base drive, transistor 10 switches "OFF" rapidly, leaving stored energy in the inductance of pulse transformer 50.

The discharge interval, designated as $T_{off}$ in FIG. 4, begins as transistor 10 switches "OFF." The voltage across the windings of transformer 50 reverses, resulting in forward bias to switching diode 20. Capacitor 31, connected in parallel across load terminals 100 and 101, presents a substantially constant voltage to secondary winding 52. With diode 20 forward biased, the energy stored in transformer 50 is discharged into the output load connected across terminal pair 100,101. The discharge current, designated $i_s$ in FIG. 1 and shown pictorally in FIG. 3, decreases as a ramp starting with maximum value $I_{sp}$ shown in FIG. 3. Reverse bias voltage, $-V_B$ in FIG. 4, is applied to the base of transistor 10 via drive winding 54, thereby holding transistor 10 "OFF" until all the energy stored in transformer 50 has discharged, $i_s$ has decreased to zero and diode 20 switches "OFF." Reverse bias to the base of transistor 10 is thereby removed and the next charging interval begins.

Voltage regulation is accomplished by tertiary winding 53, switching diode 21 and filter capacitor 30, connected between battery and ground. Tertiary winding 53 is connected between input battery (lead 60) and ground (lead 61) through diode 21 and clamps the voltage across capacitor 31 to approximately the input battery voltage (presuming a 1:1 turns ratio) when diodes 20 and 21 are "ON." During the discharge interval, as the output voltage across terminals 100,101 attempts to increase above the input battery voltage, diode 21 becomes forward biased and the energy stored in transformer 50, which is not required by the load, is returned to the input battery as a current ramp. Thus, the output load voltage is regulated for variations in load current without changing the converter switching frequency and energy not required by the load is returned to the input battery.

Two additional components are necessary to complete the basic circuit of FIG. 1. Diode 22, connected between the base of transistor 10 and the input battery, serves to protect the base-emitter junction of transistor 10 from excessive reverse voltage during the discharge interval and also provides for faster turn-off of transistor 10. Start resistor 40, connected from the base of transistor 10 to ground, provides sufficient leakage current to start the converter switching action when input battery voltage is first applied.

Figure 5:
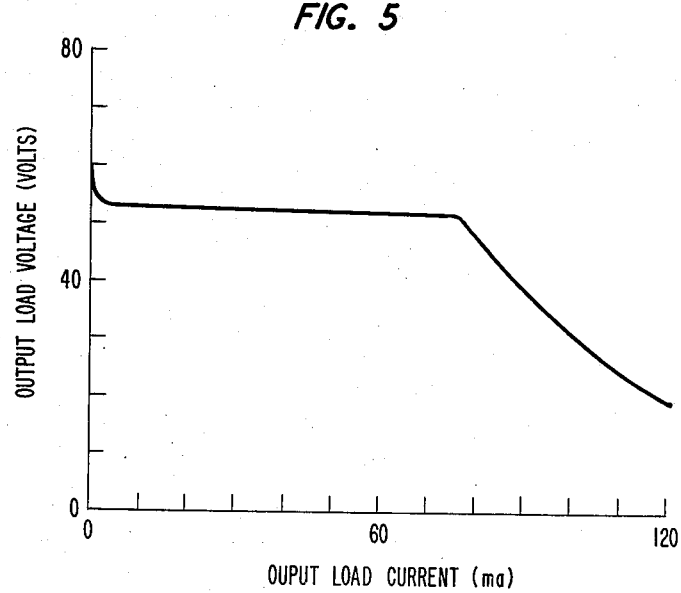
FIG. 5 depicts the load voltage-current characteristic of the illustrative embodiment of FIG. 1 for specific design parameters including an input battery voltage of 52 volts and a repetition rate of 100 kHz.

One particular voltage-current (V-I) output characteristic for the regulated converter of FIG. 1 is shown in FIG. 5; the output characteristic shown is based on design parameters of: input battery voltage of $-52$ volts on lead 60, a 100 kHz repetition rate (1/T of FIG. 4) and constant voltage up to at least 65 mA of output current. The V-I characteristic exhibits two different regions of operation. In one region, the voltage supplied to the load will remain at a predetermined value. When full load is reached, that is, maximum power output for which the converter is designed, the load voltage no longer remains fixed. In the second region, the output voltage decreases with increasing output current. This power-limiting characteristic is advantageously used in loop and trunk applications to limit the power consumed on short loops which typically yield low resistances.

An illustrative embodiment of an improved converter circuit is shown schematically in FIG. 6. During a no-load condition, for example, a customer telephone set being on-hook, the natural switching frequency of the circuit of FIG. 1 is inhibited. The peak amplitude of the current in regulation winding 53 varies inversely with converter output current and is used to provide an indication of load condition. Resistor 46, placed in series with diode 21 and ground, serves as a current shunt. When peak current in winding 53 exceeds a predetermined amplitude, sufficient voltage is developed across R2 to turn "ON" transistor 12, which has its base connected to ground and its emitter connected to the junction of resistor 46 and diode 21. Transistor 12 remains "ON" and saturated, thereby charging capacitor 32, which is connected from the collector of transistor 12 to $-V$ on lead 60. Charging of capacitor 32 continues until the peak current through resistor 46 falls below the predetermined amplitude threshold. Sufficient voltage has been developed across capacitor 32 to hold transistor 11 "ON" and saturated through the series arrangement of resistor 47 and diode 23, connecting the collector of transistor 12 to the base of transistor 11. The base of transistor 10 is thereby clamped and inhibits the natural switching operation of the converter. Clamp transistor 11 is held "ON" as capacitor 32 discharges through resistor 47 and diode 23. Diode 24 blocks discharge through base drive resistor 41 and emitter resistor 42. When capacitor 32 has discharged, transistor 11 switches "OFF" and the converter is permitted to switch normally. If there is no load, the peak current will again exceed the threshold value, indicating a no-load condition and the inhibit cycle is repeated. Switching frequency is reduced to only a few pulses per second, being just sufficient to maintain the output voltage while supplying internal losses and standby leakage.

Further reduction in no-load current drain has been obtained by removing start resistor 40 during the inhibit interval. Transistors 13 and 14 are connected as a Darlington pair such that:.their two emitters are tied to the base of transistor 10; the collector of transistor 14 is tied to one side of resistor 40, the other side going to ground; the base of transistor 14 is connected to the collector of transistor 13, with both the base and collector being tied to one side of resistor 45, the other side going to ground; and the base of transistor 13 is connected to the collector of transistor 12 through resistor 44. Transistors 13 and 14, in conjunction with resistors 44 and 45, serve as a switch which operates in response to the inhibit voltage across capacitor 32 to remove resistor 40 from the base circuit of transistor 10 during the inhibit interval.

It will be further understood that the DC-to-DC converter herein described is not limited to specific forms disclosed by way of example and illustration, but may assume other embodiments limited only by the scope of the appended claims.

I claim:

1. A blocking oscillator converter comprising a transformer having: a primary winding circuit for connecting a DC source to current switching means; a secondary winding circuit for supplying a load; a tertiary winding circuit for regulating the voltage delivered to said load; and a drive winding circuit for operating said switching means characterized by
means in said tertiary circuit for sensing current diverted from said secondary circuit and returned to said source, and
means, coupled to said means for sensing, for controlling the operation of said switching means in response to said current.

2. A blocking oscillator converter comprising a transformer having: a primary winding circuit for connecting a DC source to current switching means; a secondary winding circuit for supplying a load; a tertiary winding circuit for regulating the voltage delivered to said load; and a drive winding circuit for operating said switching means characterized by
means in said tertiary circuit for sensing current in said secondary circuit, and
a circuit comprising a capacitance-resistance path having a preselected time constant coupled to said means for sensing to operate said switching means in response to said current in said secondary circuit.

3. A blocking oscillator converter for supplying a load from a DC source, said converter comprising:
a transformer having primary, load, regulation and drive windings;
a transistor switching circuit coupling said primary winding with said DC source;
a base drive circuit including said drive winding;
a regulating circuit including said regulation winding; and
an output circuit including said load winding and said load characterized by
means in said regulating circuit for sensing current diverted from said load winding and returned to said source, and
means, coupled to said means for sensing, for controlling the operation of said transistor circuit in response to said current.

4. The converter as recited in claim 3 wherein said transistor circuit comprises a common collector arrangement having its collector connected to said primary winding, said common collector circuit and said primary winding arranged in series across said source;
said base drive circuit comprises:
a bias circuit, coupled to the base of said transistor and responsive to said drive winding, for switching said transistor to the conductive state; and
a bias inhibit circuit coupled to the base of said transistor for switching said transistor circuit to the nonconductive state;

said regulating circuit comprises:
a first unidirectional current device in series with said regulation winding;
said output circuit comprises:
a second unidirectional current device in series with said load winding, said second device and said load winding being connected across said load; and
a charge storage element connected across said load;
said transformer windings and said first and second unidirectional current devices arranged such that current flows in said load and regulation windings during said nonconducting state of said transistor; and
said means for sensing comprises a resistive circuit in series with said regulating circuit, said resistive circuit and said regulating circuit being connected across said source.

5. The converter as recited in claim 4 further comprising a control circuit, responsive to said means for sensing, for operating said bias inhibit circuit for a preselected duration.

6. The converter circuit as recited in claim 4 further comprising a starting circuit, connected to the base of said common collector arrangement, for providing bias current to initialize the operation of said converter.

7. A DC-to-DC converter to supply talking current to a telephone circuit with minimum standby power consumption comprising
means magnetically coupled to said telephone circuit for sensing load current diverted from said telephone circuit, and
means responsive to said load current sensing means for inhibiting the operation of said converter whenever said current is above a predetermined threshold.

8. A blocking oscillator converter for supplying a load from a DC source, said converter comprising:
a transformer having primary, load, regulation and drive windings;
a transistor switching circuit coupling said primary winding with said DC source;
a base drive circuit including said drive winding;
a regulating circuit including said regulation winding; and
an output circuit including said load winding, and said load wherein
said transistor circuit comprises a common collector arrangement having its collector connected to said primary winding with said collector circuit and said primary winding arranged in series across said source,
said base drive circuit comprises a bias circuit, coupled to the base of said transistor and responsive to said drive winding, for switching said transistor to the conductive state, and a bias inhibit circuit coupled to the base of said transistor for switching said transistor circuit to the nonconductive state,
said regulating circuit comprises a first unidirectional current device in series with said regulation winding,
said output circuit comprises a second unidirectional current device in series with said load winding and a charge storage element connected across said load, said second device and said load winding also being connected across said load, said transformer windings and said first and second unidirectional current devices arranged such that current flows in said load and regulation windings during said nonconducting state of said transistor, said means for sensing comprises a resistive circuit in series with said regulating circuit, said resistive circuit and said regulating circuit being connected across said source, said converter further characterized by a control circuit, responsive to said means for sensing, for operating said bias inhibit circuit for a preselected duration and comprising:

a capacitor in series with said source, a sense transistor having its base-emitter connected across said resistive circuit and its collector connected to said capacitor, and a discharge circuit connected between said capacitor and said bias inhibit circuit for establishing said preselected duration.

9. A blocking oscillator converter for supplying a load from a DC source, said converter comprising:

a transformer having primary, load, regulation and drive windings;

a transistor switching circuit coupling said primary winding with said DC source;

a base drive circuit including said drive winding;

a regulating circuit including said regulation winding; and an output circuit including said load winding and said load wherein said transistor circuit comprises a common collector arrangement having its collector connected to said primry winding with said collector circuit and said primary winding arranged in series across said source, said base drive circuit comprises a bias circuit, coupled to the base of said transistor and responsive to said drive winding, for switching said transistor to the conductive state, and a bias inhibit circuit coupled to the base of said transistor for switching said transistor circuit to the nonconductive state, said regulating circuit comprises a first unidirectional current device in series with said regulation winding, said output circuit comprises a second unidirectional current device in series with said load winding and a charge storage element connected across said load, said second device and said load winding also being connected across said load, said transformer windings and said first and second unidirectional current devices arranged such that current flows in said load and regulation windings during said nonconducting state of said transistor, said means for sensing comprises a resistive circuit in series with said regulating circuit, said resistive circuit and said regulating circuit being connected across said source, said converter further characterized by a starting circuit, connected to the base of said common collector arrangement, for providing bias current to initialize the operation of said converter, a control circuit, responsive to said means for sensing, for operating said bias inhibit circuit for a preselected duration, and a disable circuit, interposed between said starting circuit and the base of said common collector arrangement and responsive to said means for sensing, for disabling said starting circuit during said preselected duration.

* * * * *